Figure 2:
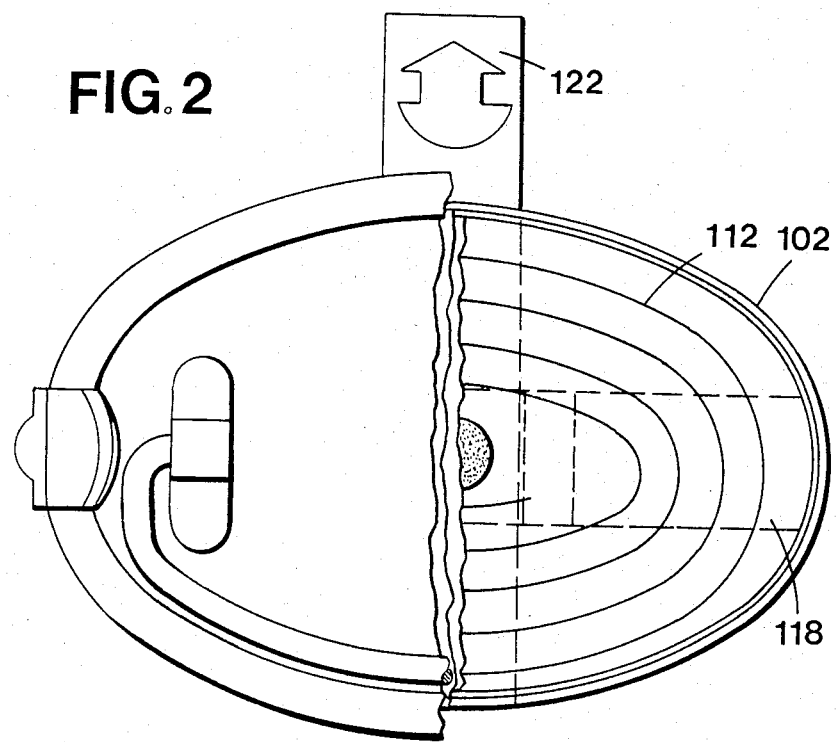

United States Patent [19]

Zellweger et al.

[11] Patent Number: 4,506,654
[45] Date of Patent: Mar. 26, 1985

[54] HEATING DEVICE

[75] Inventors: Conrad Zellweger, Chêne-Bougeries; Victor Spreter, Meinier, both of Switzerland

[73] Assignee: Pozel S.A., Fribourg, Switzerland

[21] Appl. No.: 491,427

[22] PCT Filed: Aug. 4, 1981

[86] PCT No.: PCT/EP81/00112

§ 371 Date: Apr. 4, 1983

§ 102(e) Date: Apr. 4, 1983

[87] PCT Pub. No.: WO83/00425

PCT Pub. Date: Feb. 17, 1983

[51] Int. Cl.$^3$ .............................................. A47G 23/04
[52] U.S. Cl. ................................. 126/262; 126/261; 44/76
[58] Field of Search ............... 126/261, 262, 263, 43; 44/3 R, 14, 38–40, 76; 426/109, 113

[56] References Cited

U.S. PATENT DOCUMENTS

| 824,938 | 7/1906 | Lang | 126/262 |
| 2,020,292 | 10/1932 | Eggert et al. | 126/262 |
| 2,388,466 | 10/1910 | Caldwell | 126/263 |
| 2,581,131 | 1/1952 | Naranick | 126/262 |
| 2,584,040 | 1/1952 | Naranick | 126/262 |
| 2,643,650 | 6/1950 | Miron | 126/262 |
| 2,764,475 | 9/1956 | Bovard et al. | 44/3 R X |
| 3,079,911 | 7/1959 | Ryan et al. | 126/263 |
| 3,094,981 | 1/1962 | Brewer | 126/263 |
| 3,399,663 | 9/1968 | Klaiber | 126/262 |
| 3,662,741 | 5/1972 | Licher | 126/263 |
| 3,683,889 | 8/1972 | Hoffman | 126/263 |
| 3,874,365 | 7/1974 | Pava | 126/263 |
| 4,424,798 | 1/1984 | Volk | 126/262 |

FOREIGN PATENT DOCUMENTS

| 216444 | 6/1958 | Australia | 126/262 |
| 663353 | 8/1938 | Fed. Rep. of Germany | 126/262 |
| 1429997 | 3/1969 | Fed. Rep. of Germany | 126/262 |
| 914556 | 10/1946 | France | |
| 919928 | 3/1947 | France | |
| 1434734 | 2/1966 | France | |
| 2469669 | 5/1981 | France | 126/263 |
| 575475 | 1/1943 | United Kingdom | |

Primary Examiner—Margaret A. Focarino
Attorney, Agent, or Firm—Lewis H. Eslinger

[57] ABSTRACT

The heating device for heating liquid and solid products comprises a heating element intended to heat a food preserve (314) or container structure. The heating element consists of a flat tile like element including a heat spreading layer (308) made of heat conducting material, an intermediate layer (303) composed by an exothermic gas-less combustible material and a layer of heat insulating incombustible material (301). The intermediate layer contains internal walls (302) defining a fire path in order to control the duration of the exothermic reaction. Ignition means comprises a cup-shaped primer (305) with in its center a protruding cone (307) and a starter (311) consisting of a striker arranged to be drawn across a friction sensitive element and intended to ignite the tip of said cone (307) of the primer (306), which in its turn induces the reaction to the combustible material (303). In the later the reaction progresses at a speed comprised between 4 and 20 mm per second and the heat released is dissipated by the heat spreading layer from where it flows into the medium to be heated (314).

22 Claims, 8 Drawing Figures

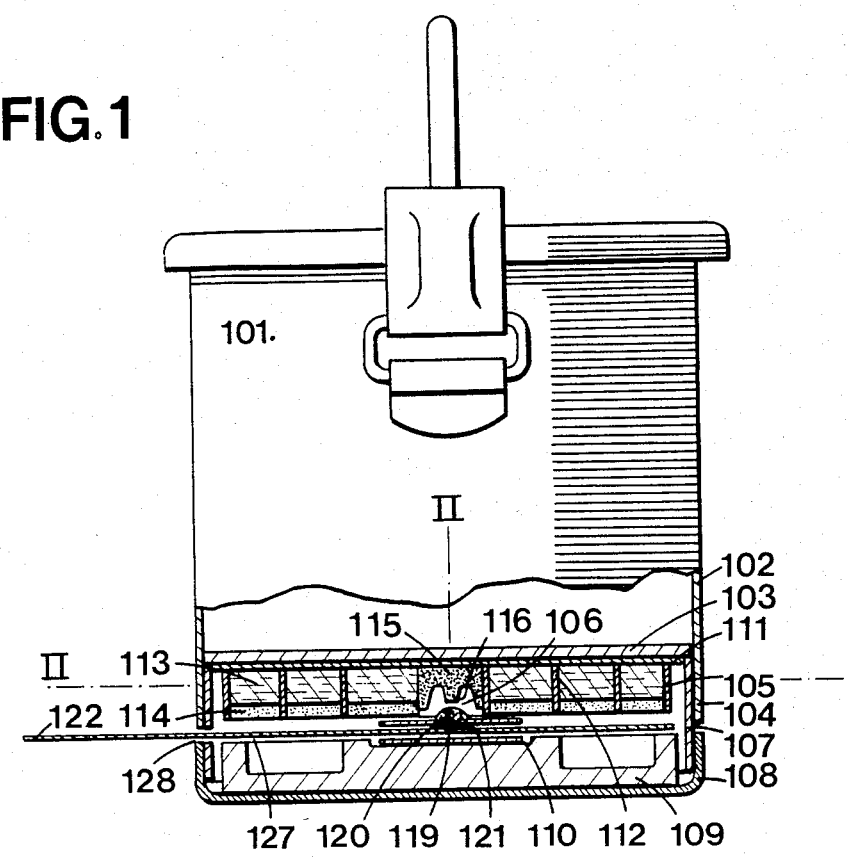
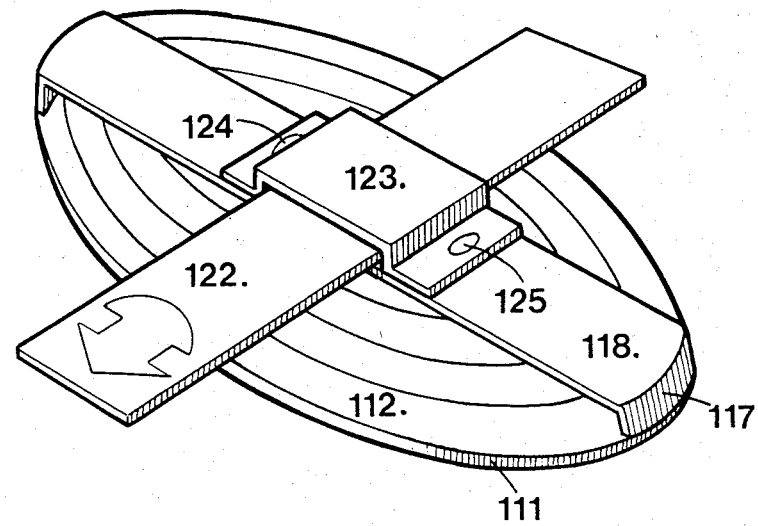

HEATING DEVICE

The present invention relates to a heating device for heating liquid and solid products.

A number of different types of devices comprising a container structure and a heating element, i.e. so called self-heating containers, have been previously proposed, which include a substance capable of giving rise to an exothermic reaction, so that when the reaction occurs the contents of the container are heated.

It is known from the literature that the burning time of a heating element depends not only on the composition which is used, but also on the heat conductivity characteristics of its receptacle and how the heat produced by the reaction is extracted from the mass. In order to control and to increase the duration of the reaction, it has been proposed to embed, in the exothermic combustible material, internal walls or partitions of some refractory material reaching from the top to the bottom of the heating element and insuring a fire path.

Some devices of this type are dangerous to operate, since the heating element is not insulated from the surroundings or may be separated from the container and then actuated. As a result the heat flow produced is not absorbed by the container and its contents, but rather is directed towards the surroundings.

As the heat produced in such heating devices, particularly those of the thermite type, can have an extremely high temperature value, up to 1200° C., such devices are dangerous to handle manually and may cause fires or explosions. In addition, previously proposed arrangements have not satisfactorily heated the contents of the container in a uniform manner, nor have they been convenient or simple to use.

It is an object of the present invention to provide a heting device which comprises a suitable structure allowing a proper heat dissipation to the contents of the container or food preserve and providing uniform heating thereof whilst insuring complete heat insulation to the surroundings and therefore great safety in use.

Another object of the present invention is to provide a heating device that includes a relatively simple and safe ignition arrangement for the combustible material which is reliable in use and which requires no special accuracy in manufacturing.

A further object of the present invention is to provide a heating device which is cheap to manufacture for its manufacturing can be automated.

A still further object of the invention is to completely separate the conditioning of the food into a sterile packaging and the manufacturing of the heating element, both being assembled as completed units.

Yet another object of the present invention is to provide an improved exothermic gas-less composition in liquid or semi-liquid form by the use of a liquid binder for it is well known that it is much easier to handle a liquid or a paste rather than powder. The use of liquids or pastes allow to get cakes of composition with a fully controlled porosity and this for any shape which can be casted, while powders can only be compressed to a given porosity or density in very limited shapes such as cylinders. It is well known from the pyrotechnicaL art that the porosity of a pyrotechnical reactive mass is determinant for its burning speed.

In order to realize these objects, the invention provides a heating device for heating liquid and solid products comprising a container structure and heating means located at the base of the container structure, said heating means comprising a heating element including a supply of exothermic gas-less combustible material, containing internal walls defining at least one fire path, which heating device is characterized in that said heating element consists in a flat tile like element comprising a heat spreading layer made of heat conducting material, an intermediate layer composed by said exothermic gas-less combustible material and containing said internal walls and a layer of heat insulating incombustible material. Ignition means are connected to said combustible material through an opening in at least one of the layers encasing the combustible material.

Figure 4:
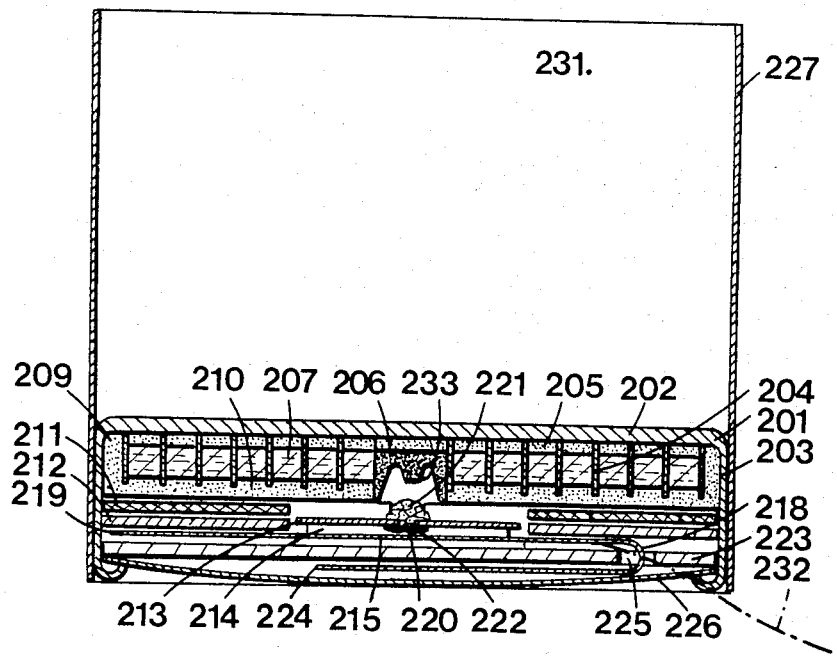
Figure 5:
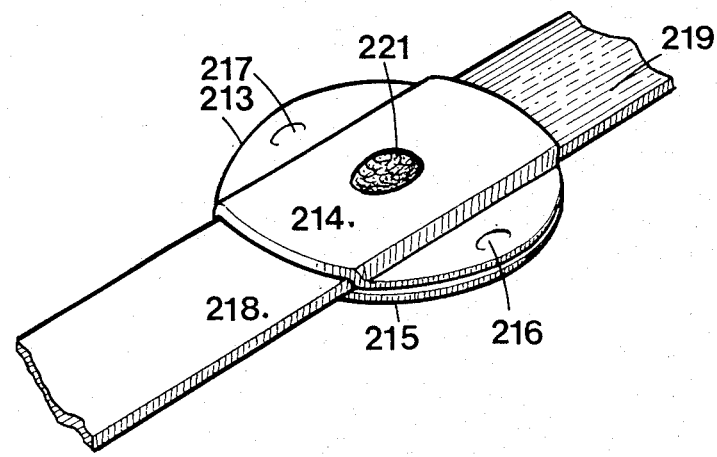
Figure 6:
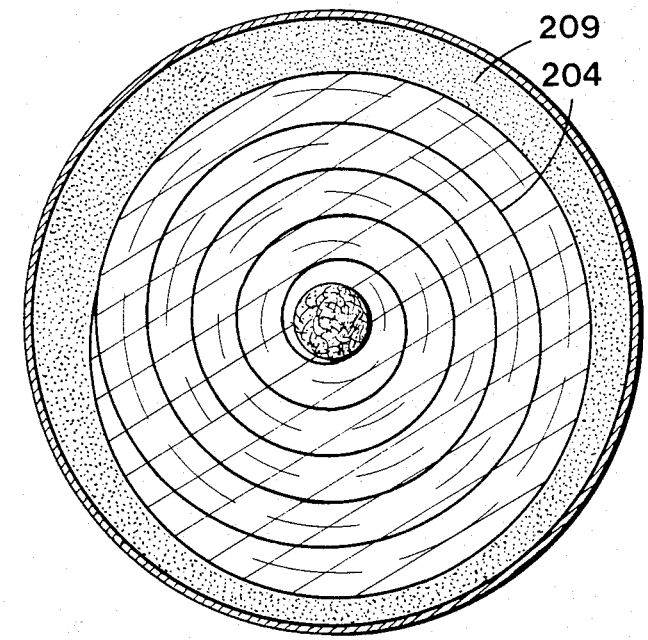
Figure 7:
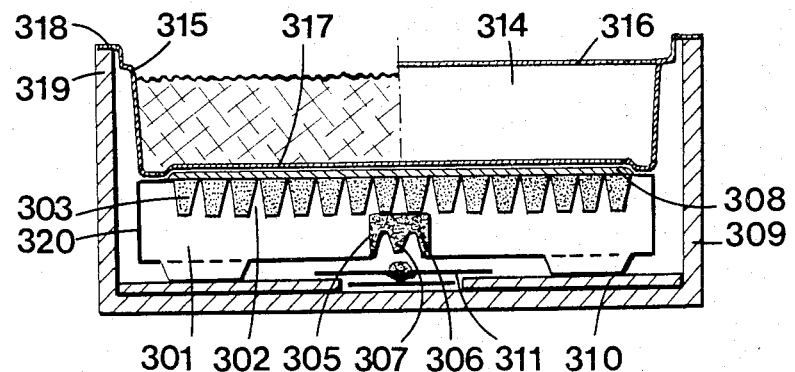
Figure 8:
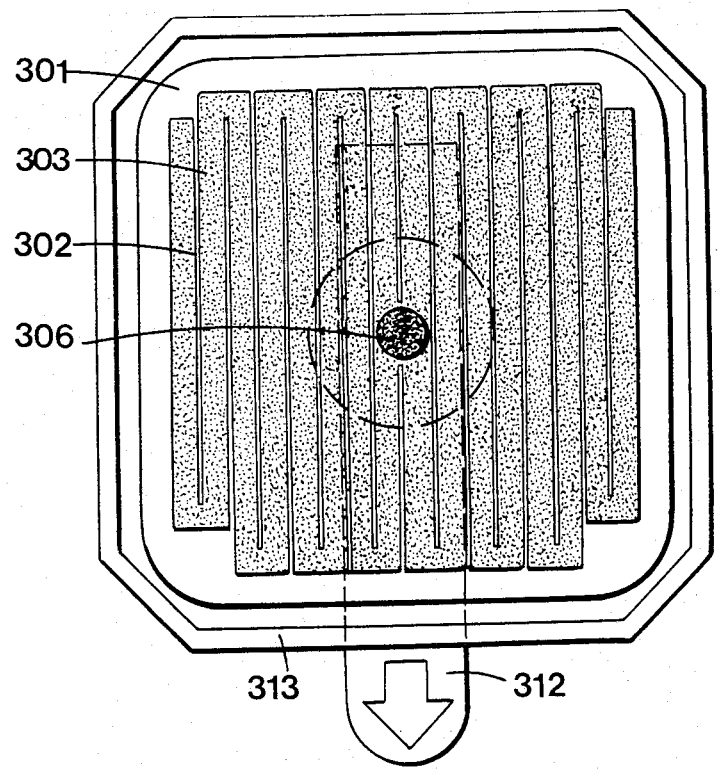

The above, and other objects, features and advantages of this invention will be apparent in the following detailed description and the accompanying drawings, wherein:

FIG. 1 shows a heating device with a cross-section of its bottom part,

FIG. 2 shows a top view of said container with a cross-section along line II—II of FIG. 1, FIG. 3 shows the heating element separated from the container, FIG. 4 shows another embodiment of the invention, FIG. 5 is a perspective view of the starter used in the embodiment of FIG. 4, FIG. 6 shows a cross-section through a heating element, FIG. 7 is a cross-section through a third embodiment of the invention and FIG. 8 shows a cross-section through the heating element of the embodiment illustrated in FIG. 7.

The heating device shown in the FIGS. 1, 2 and 3 consists in a container with a peripheral wall 102 preferably made of metal to which is secured in a water tight manner a flat, relatively thick, bottom part 103 made of good heat conducting material such as aluminium. A portion 104 of the peripheral wall 102 extends beyond the bottom plate 103 forming the recess which can accomodate the heating element 105 and its ignition system 106. The ring shaped element 107 is inserted against the peripheral wall 102. This ring shaped element guides and supports cover 108 which is engaged in a frictional relationship with the ring 107. This cover is lined with insulating material 109. This material can consist of glass fibers, rockwool, ceramic etc. This cover maintains pressed against bottom 103 the heating element 105, the recess 110 provided in the insulating material accomodates the ignition system. The heating element shown in FIG. 3 consists of a heat diffusion plate 111 made of a good heat conducting material such as aluminium. Perpendicular walls 112 made of heat conducting material, such as steel, are secured to the heat diffusion plate 111 in a heat transmitting way. These walls define the fire path for the exothermic material 113 contained therein. A convenient shape for the fire path is a spiral like disposition of these walls. The exothermic material 113 consisting of a thermitic composition such as manganese dioxide and silicon and an inert material such as silica added with a suitable binder such as a silicate is casted in the fire path.

Several inventors have proposed in the past to use thermite which is a reaction of iron oxide with aluminium as exothermic material. The reaction temperature which is over 2,000° C. led to plunger type constructions which are very unfavourable as far as the heat transfer to the food to be heated. The idea of the invention is to provide a container in which the food is heated from the bottom such as to provide a natural convection for liquids or to allow stewing. This is possible through the use of reactive compositions burning at lower temperatures. It was found that silicon with various oxydants like red lead, manganese dioxide, copper oxide, give a gas-less exothermic reaction, the speed of propagation of which can be controlled by the addition of inert material such as silica, china clay etc. It has been found that the use of oxydants containing little oxygen like minium gives lower reaction temperatures than the ones containing a great amount of oxygen like manganese dioxide and that the heat output per unit of weight could be adjusted by using two or more oxydants, for example a mixture of manganese dioxide and minium as well as by varing the amount of inert material.

The exothermic material is covered by a layer of heat insulating material such as finely ground silica with a suitable binder such as silicate or with plaster. Before casting the exothermic material 113 and the insulating layer 114, a primer 115 is placed at the center of the spiral. This primer consists in a composition which is reactive when heated up to approximately 400° C. A typical composition of this type is finely ground silicon mixed with lead oxide (Pb O$_2$). This composition mixed with a suitable binder such as silicate is cast in a separate mould in order to form a cup shaped body with a finger like free standing body, like conical part 116, protruding from the bottom. The external walls of this primer are in contact with the exothermic material 113 and this primer is accessible through an opening in the layer 114 of insulating material.

The ignition means consist in a thin metal strip 118. The ends of this metal strip are bent over the end of the rim of the heating element as shown in 117. This U shape element is located by a slight spring action of the legs 117. The metal strip 118 is pierced at its center; a drop 120 of exothermic material burning with very high heat such as a mixture of boron powder and potassium perchlorate (KC1 04) bound with a glue is casted on the hole in such a way that the paste-like material protrudes through the hole 119. A friction sensitive material 121 equally bound with glue such as a match head composition is cast on the other side of the metal strip. A pull tab 122 consisting of a strip of strong paper or similar material covered on one side with match striking material is laid accross the match head composition 121 and maintained resiliently against it by a thin flexible metal strip 123 spot welded at both ends 124-125 to the strip 118. As shown in FIG. 1, this ignition means are placed on the heating element, the exothermic material 120 facing the opening and the cone of the primer 116.

A cavity 110 made in the insulating layer 109 of cover 108 accomodates the protruding part of these ignition means 118. Slots 127 and 128 are provided between the insulating layer of the cover and the heating element and between the cover 108 and the body of the container 101. The pull tab 122 protrudes through the slot 127 to the outside.

The function of the heating device is the following: after having filled the container 101 with the food to be heated, the pull-tab 122 is pulled out, igniting by friction the match head composition 121 which communicates the fire to the exothermic composition 120. The heat radiated by this composition is strong enough to ignite the cone 116 of the primer, the reaction propagates through the body of the primer by contact to the exothermic material 113 which fills the firepath. The heat generated by the slowly progressing reaction is conducted by the metal fins 112 to the heated dissipating plate 111 which is in contact with bottom plate 103 of the container to which the heat is transferred and which acts as a further heat spreading element. Thickness of the bottom 103 is chosen in such a way as to insure a proper heat dissipation in the whole bottom avoiding scorching of the food to be heated. By varying the proportions of the constituents of the exothermic composition, the speed of the propagation of the reaction can be adjusted and it is preferably maintained such as to produce not more than 25 Watts per square centimeter when considering the total surface of the heat dissipating plate 111.

After burning out, the heating element 105 can easily be removed and replaced by a new one.

For safety reasons, the heating element should not be operable when not properly secured in the bottom of container 101. As described here above, the ignition system is located on the heating element by the two resilient legs 117 pressing against side walls of the heating element. When outside the container, if the pull tab is actuated, the whole ignition system is pulled away without functioning. In the container the ignition system is maintained in place by the mating recesses 110 formed in the insulating layer 109 of cover 108.

In the second embodiment of the invention shown in FIG. 4, the heating element consists of a deep drawn dish shaped member 201 made of a good heat conductive material such as aluminium, the bottom 202 of which is the heat dispersing surface. The peripheral wall 203 is obtained by deep drawing process and can be thinned down to save material. Perpendicular walls 204 made of a heat conductive material like steel are secured in a heat conductive contact to the heat dispersing plate 202 in a configuration as to form a fire path. An ideal configuration is a spiral as shown in FIG. 6. A thin insulating layer 205 made of heat resistant material such as silica bound with a silicate is cast in the fire path. A cut shaped primer 206 with in its center a protruding cone is placed at the center of the spiral on the thin heat insulating layer 205. The exothermic reactive material 207 is mixed to a suitable binder like a silicate and cast in the fire path. The end of the last turn of the spiral 204 is bent in such a way as to close the fire path leaving an annular space 209 between wall 203 and the spiral. On top of the exothermic material 207 an insulating layer 210 which can consist of silica bound with a silicate or plaster is cast filling also the annular recess 209. A ring shaped spacer 211 made of insulating material like corrugated aluminium foils or glass fibers mat is placed on insulating layer 210. A ring shaped cardboard 212 is placed on the spacer. Starter 213 is located in the center of the ring. The starter consists in a U shaped metal disc 214, spot welded to a flat metal disc 215 by spot welds 216 - 217 forming between them a channel in which is placed a pull-tab 218 made of flexible material like paper coated with match striking composition on its end 219, on the side facing the U shaped disc. The U shaped disc is pierced at its center, a drop 221 of exothermic material such as boron and K perchlorate bound with glue is cast on the hole 220 made in the center of the U shaped member. A drop of match head composition 222 bound with glue is cast on hole 220 on the inside of the U such as to be in contact with exothermic material 221 through said hole. A cardboard disc 223 maintains the starter 213 in its location. The end 224 of pull-tab 218 passes through hole 225 made in the cardboard disc 223 and this end of the pull-tab 224 is folded over this cardboard disc. A fracturable sealing membrane 226 made of water impervious material like polyethylene is placed on top of the disc 223 to maintain in its place the pull-tab. The protruding ends of the receptacle 201 are rolled over maintaining the spacer 211, cardboard disc 212, 223 and the sealing foil 226 tightly pressed in their location. The heating element as described is a completely sealed unit which can easily be stored and handled such as before being adapted to the wall of a container in such a way as to make it a self-heating container. In FIG. 4 part 227 is a tube shaped member made of a water impervious material such as aluminium and plastic films lined cardboard impregnated with silicate. The heating element 201 is adapted to this tube by a push fit strong enough to be water tight. This tube 227 forms the peripheral wall of the self-heating container 231. Before filling, the container membrane 226 is fractured, the pull-tab is folded towards the outside of the container as shown in the dotted line 232, the container is then filled with the medium to be heated. By pulling out the pull-tab 218, its coated end 219 rubs against the match head composition 222 which ignites, activating the exothermic composition 221, the heat radiated by this reaction is strong enough to heat the tip of cone 233 protruding from the bottom of the cup shaped primer 206 above its ignition temperature starting the burning of the primer, which in its turn induces the reaction of exothermic composition 207. This reaction progresses at a speed comprised between 4 and 20 mm per second and the heat released is dissipated by conduction by the heat conducting fins 204 spreading this heat into the heat dissipating plate 202 from where the heat flows into the medium to be heated. The insulating layer 205 prevents a direct contact between the heat dissipating plate 202 with the exothermic material; this heat insulating barrier favours the spreading of the heat by the means of the fins into the heat dissipating plate 202 avoiding hot spots on this plate and scorching of the food to be heated. The heat insulation 210 as well as spacer 211 and the two cardboard discs 212,223 form a multilayer insulating barrier preventing the heat to flow in the direction opposite to the heat dissipating plate 202. The fins 204 act as a heat sink conducting the heat into the dissipating plate and avoiding greatly a heat transfer to the unreacted part of the exothermic material which could lead to non controlled progression of the reaction. Example: According to the embodiment shown in FIG. 4, we have found that a 70 gram quantity of heating mixture can raise the temperature of 400 cc of water from normal room temperature, say 20° C., to 72° C. in two minutes. Caloric output is 300 cal./g.

In the third embodiment illustrated in the FIGS. 7 and 8, the heating element consists in a refractory support 301 made of mouldable material such as plaster, clay etc. The support is moulded in such a way as to create on one side a fire path 303 constituted by grooves separated by the raised walls 302. These walls are disposed in such a way as to form two zigzags starting from the center as shown in FIG. 8. The refractory support 301 shows at its center a hole 305 in which a primer 306 is placed. This primer consists in a reactive composition bound with a suitable binder and cast in a separate mould such as to take a cup like shape with a finger like element 307 raising inside the cup from its bottom. After solidification this primer is placed in hole 305. The reactive mass mixed with a suitable binder is cast in the fire path 303 and gets in contact with primer 306. On top of the reactive mass, a layer 308 consisting in finely ground heat conducting material such as a metal powder or a metalloid powder like graphite mixed with a suitable heat resistant binder such as a silicate is cast. To reinforce this layer, a thin sheet of non combustible fibers, like glass fibers, can be embedded. This sheet is not shown on the drawing.

This heating element is secured to the bottom of a cardboard container 309 by gluing or by any other suitable means. The starter 311 as shown in FIG. 5 and described previously is located in a recess of cardboard layer 310. The pull tab 312 protrudes through a slot made in wall 313 of the container 309 and is accessible from the exterior. A food preserve 314 consisting in a shallow dish 315 made of thin deep drawn aluminium foil sealed with a thin membrane of aluminium 316 is placed on the heating element 301 in such a way as to insure contact with the bottom 317 of the preserve with the heat dispersing layer 308. This preserve is firmly located on the cardboard box 309, for example by wedging, or by gluing its edges 318 to the rim 319 of cardboard box 309 with for example a hot melt.

This whole assembly constitutes a self heating food preserve. After removing cover 316, the heating reaction is started by pulling out pull-tab 312.

It is obvious that this heating device could be supplied with the container 315 being empty, this apparatus constituting a disposable self-heating container.

The primer 306 could be placed in reverse position directly in the fire path, accessible through an opening in the heat dispersing layer 308. In this case, the starter should be placed between bottom 317 of the container 315 and heat dispersing layer 308. The finger like body 307 could also be tipped with a friction sensitive material and the pull-tab maintained resiliently against friction sensitive tip.

Similarly the primer 306 could be placed in a hole of one of the side walls 320 of the heating element, the starter being located adequately between wall 320 and the vertical wall of cardboard 309.

We claim:

1. A heating device for heating liquid and solid products comprising a container structure and heating means located at the base of the container structure, said heating means comprising a heating element including a supply of exothermic gas-less combustible material characterized in that said heat element consists of a flat tile like three-layer element comprising a first heat spreading layer made of heat conducting material, a second, intermediate layer composed of said exothermic gas-less combustible material, and a third layer made of heat insulating incombustible material, ignition means being in operable contact with said combustible material through an opening in at least one of said first and second layers encasing the combustible material and, said heating element further comprising walls arranged throughout said second layer substantially perpendicular to said first layer and dividing said combustible material to define at least one fire path extending from said opening for said ignition means.

2. A heating device according to claim 1, characterized in that said ignition means comprises an ignition element including a finger like free standing member in contact with said combustible material, a free end of said member being adapted for ignition.

3. A heating device according to claim 1 or 2, characterized in that the ignition means comprises an element made of friction sensitive material and a striker arranged to be drawn across said friction sensitive element.

4. A heating device according to claim 3, characterized in that said friction sensitive element is adapted to ignite said free end of the finger by contact-less heat radiation.

5. A heating device according to claim 2, characterized in that said ignition means further comprises a cup shaped member arranged to have said member protruding substantially from the middle of the cup.

6. A heating device as defined in claim 1, characterized in that said walls defining a fire path are of good heat conducting material and in heat transmitting contact with the heat spreading layer.

7. A heating device as defined in claim 1, characterized in that said heat spreading layer consists of an aluminium foil.

8. A heating device as defined in claim 1, characterized in that said heat spreading layer consists of a finely ground metal or metalloid bound with a heat resistant binder.

9. A heating device as defined in claim 8, characterized in that said metalloid is carbon.

10. A heating device as defined in claim 8, characterized in that said heat spreading layer includes non combustible fibers.

11. A heating device as defined in claim 1, characterized in that said heating element includes a fourth layer comprising a thin heat insulating layer made of heat resistant material interposed between said first heat spreading layer and said second layer formed of said exothermic gas-less combustible material.

12. A heating device as defined in claim 1, characterized in that said walls defining a fire path are composed of heat insulating incombustible material made up with said insulating layer in one plate formed by casting.

13. A heating device as defined in claim 1, characterized in that said walls are formed having a predetermined length to form said fire path, thereby dividing said combustible material to have a surface for combustion such that the heat produced by the exothermic reaction is less than 25 watts per square centimeter of said base.

14. A heating device as defined in claim 1, characterized in that said container structure is a food preserve consisting in a heat conducting uncombustible foil shaped in a disposable dish, whose bottom is in contact with said heating element, said food preserve and heating element being placed in a receptacle.

15. A heating device according to claim 1, characterized in that said tile like element forms the bottom of an open container.

16. A heating device according to claim 1, characterized in that the tile like element is in contact with the outer face of the bottom of a container.

17. A heating device as defined in claim 1, characterized in that said exothermic gas-less combustible material comprises at least 20% silicon and at least 10% minium.

18. A heating device as defined in claim 17, characterized in that said exothermic gas-less combustible material contains at least one metal oxide other than minium and a suitable binder.

19. A heating device as defined in claim 18, characterized in that said exothermic gas-less combustible material comprises at least 20% manganese dioxide.

20. A heating device as defined in claim 17, characterized in that said exothermic gas-less combustible material contains an inert material.

21. A heating device according to claim 1, characterized in that the ingredients of the exothermic gas-less combustible layer are bound together with an uncombustible binder.

22. A heating device according to claim 1 or 21, characterized in that the exothermic gas-less combustible layer and the insulating layer are made from mixtures which can be cast.

* * * * *